(12) United States Patent
Watanabe et al.

(10) Patent No.: US 9,973,734 B2
(45) Date of Patent: *May 15, 2018

(54) VEHICLE CIRCUMFERENCE MONITORING APPARATUS

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Okazaki (JP); Itsuko Ohashi, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 171 days.

This patent is subject to a terminal disclaimer.

(21) Appl. No.: 14/972,992

(22) Filed: Dec. 17, 2015

(65) Prior Publication Data

US 2016/0182863 A1 Jun. 23, 2016

(30) Foreign Application Priority Data

Dec. 19, 2014 (JP) .................................. 2014-258020

(51) Int. Cl.
*H04N 7/18* (2006.01)
*G09G 5/38* (2006.01)
*G06T 3/60* (2006.01)
*B60R 1/00* (2006.01)

(52) U.S. Cl.
CPC .............. *H04N 7/181* (2013.01); *B60R 1/00* (2013.01); *G06T 3/60* (2013.01); *G09G 5/38* (2013.01); *H04N 7/183* (2013.01); *B60R 2300/306* (2013.01)

(58) Field of Classification Search
None
See application file for complete search history.

(56) References Cited

U.S. PATENT DOCUMENTS

2005/0270500 A1* 12/2005 Ito .............................. B60R 1/00
353/99
2008/0309764 A1* 12/2008 Kubota ..................... B60R 1/00
348/148
2010/0164702 A1* 7/2010 Sasaki .................... G01B 21/22
340/438

(Continued)

FOREIGN PATENT DOCUMENTS

JP 09-052555 A 2/1997

*Primary Examiner* — John Olszewski
*Assistant Examiner* — Navid Ziaeianmehdizadeh
(74) *Attorney, Agent, or Firm* — Sughrue Mion, PLLC

(57) ABSTRACT

A vehicle circumference monitoring apparatus includes: an image acquisition section that acquires captured image data output from an imaging section that is provided in a vehicle and images a circumference of the vehicle; a state acquisition section that acquires vehicle state data output from a vehicle state detection section that is provided in the vehicle and detects at least a roll state of the vehicle; a setting section that sets a center of rotation to rotate a display image depending on the roll state if the display image is displayed on a display device based on the captured image data; an image adjustment section that rotates a display state of the display image about the center of rotation that is set depending on the roll state; and an output section that outputs the display image to the display device.

14 Claims, 9 Drawing Sheets

(56) References Cited

U.S. PATENT DOCUMENTS

| | | | |
|---|---|---|---|
| 2010/0270133 A1* | 10/2010 | Baker | H01H 25/041 200/4 |
| 2012/0162427 A1* | 6/2012 | Lynam | B60R 1/00 348/148 |
| 2013/0222275 A1* | 8/2013 | Byrd | G06F 3/04883 345/173 |
| 2013/0222646 A1* | 8/2013 | Tsubota | H04N 5/23293 348/239 |
| 2014/0009415 A1* | 1/2014 | Nishida | G06F 3/04886 345/173 |
| 2015/0022664 A1* | 1/2015 | Pflug | H04N 7/181 348/148 |
| 2015/0033176 A1* | 1/2015 | Miichi | G09B 29/007 715/771 |
| 2015/0183371 A1* | 7/2015 | Okada | B60R 1/00 348/148 |

* cited by examiner

VEHICLE CIRCUMFERENCE MONITORING APPARATUS

CROSS REFERENCE TO RELATED APPLICATIONS

This application is based on and claims priority under 35 U.S.C. § 119 to Japanese Patent Application 2014-258020, filed on Dec. 19, 2014, the entire contents of which are incorporated herein by reference.

TECHNICAL FIELD

This disclosure relates to a vehicle circumference monitoring apparatus.

BACKGROUND DISCUSSION

In the related art, as a technique for supporting a driving operation of a vehicle, a technique for supporting a driving operation of a driver by imaging a circumferential environment of the vehicle by an imaging device such as a camera mounted on the vehicle and displaying captured image data as an imaging result has been proposed. If driving support is performed by using the captured image, when the imaging device is fixed to the vehicle, an imaging range of a captured image is also inclined if the vehicle is inclined. In this case, if the captured image data is displayed on a display device as it is, the display image is displayed in a state of being inclined and it may give an uncomfortable feeling to a user. Thus, if the image is obtained in a state where the vehicle is inclined, there is a technique for displaying the obtained image by rotating the image depending on an inclined angle of the vehicle.

JP9-52555A (Reference 1) is an example of the related art.

Inclination of an entire image can be eliminated by performing correction for rotating the image, but an object on the image is moved about a center of rotation. In this case, a moving amount due to a rotating process is increased as a distance increases from the center of rotation. The display device is often set such that a vicinity of a center of the display image is the front of the vehicle. Thus, if the rotating process is performed by allowing the vicinity of the center of the display image to be the center of rotation, the moving amount of the object is increased in an upper region (far region) and a lower region (near region) of the display device, that is, a peripheral region of the image. For example, actually, an object present far in front of the vehicle may be displayed so as to be present at a position shifted from the front and vice versa. A similar phenomenon may also occur for an object present in the vicinity of the vehicle. Thus, a difference occurs between the circumferential environment displayed on the display device and a circumferential state of the reality that is viewed by a user on a windshield, and there is a problem that gives an uncomfortable feeling to the user.

SUMMARY

A vehicle circumference monitoring apparatus according to an aspect of this disclosure includes, for example, an image acquisition section that acquires captured image data output from an imaging section that is provided in a vehicle and images a circumference of the vehicle; a state acquisition section that acquires vehicle state data output from a vehicle state detection section that is provided in the vehicle and detects at least a roll state of the vehicle; a setting section that sets a center of rotation to rotate a display image depending on the roll state if the display image is displayed on a display device based on the captured image data; an image adjustment section that rotates a display state of the display image about the center of rotation that is set depending on the roll state; and an output section that outputs the display image to the display device.

BRIEF DESCRIPTION OF THE DRAWINGS

The foregoing and additional features and characteristics of this disclosure will become more apparent from the following detailed description considered with the reference to the accompanying drawings, wherein:

FIG. 12A is a view illustrating an original display region (imaging region) corresponding to captured original image data, and FIG. 12B is a view illustrating a shape of a corrected display region after conversion.

DETAILED DESCRIPTION

Hereinafter, an example, in which a vehicle circumference monitoring apparatus of an embodiment is mounted on a vehicle 1, will be described. In the embodiment, the vehicle 1 may be, for example, an automobile (internal combustion engine automobile) in which an internal combustion engine (engine (not illustrated)) is a driving source or an automobile (electric automobile, a fuel cell automobile, and the like) in which an electric motor (motor (not illustrated)) is a driving source. In addition, the vehicle 1 may be an automobile (hybrid electric vehicle) in which both are the driving source. In addition, the vehicle 1 is able to mount various transmissions and is able to mount various devices (systems, parts, and the like) necessary for driving the internal combustion engine or the electric motor. In addition, a type, the number, a layout, and the like of a device for driving wheels 3 in the vehicle 1 can be variously set.

Figure 1:
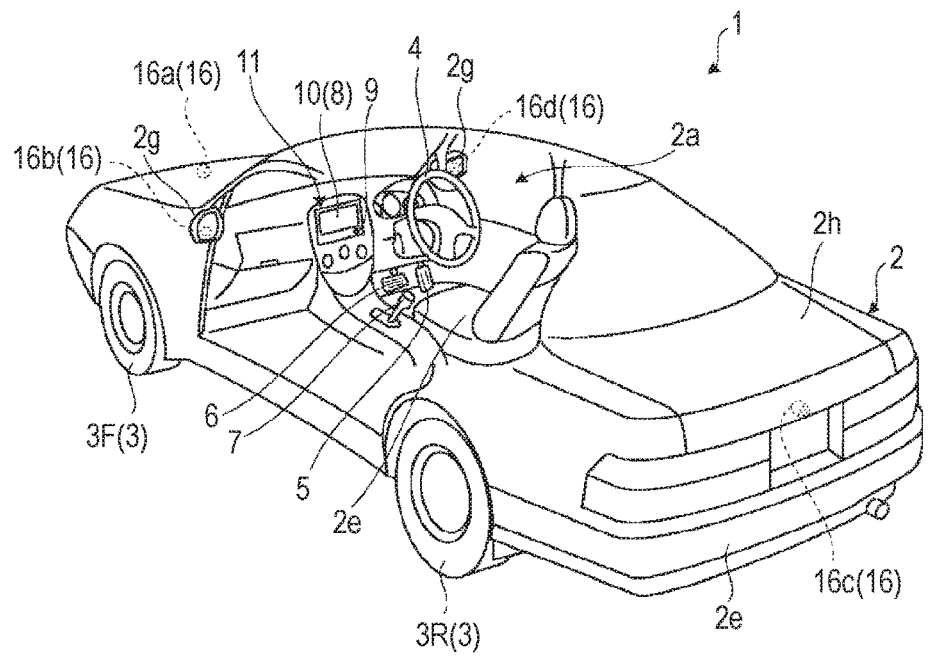
FIG. 1 is a perspective view illustrating an example of a state where a part of a vehicle interior of a vehicle on which a vehicle circumference monitoring apparatus according to an embodiment is mounted is viewed.

As illustrated in FIG. 1, a vehicle body 2 according to the embodiment is configured of a vehicle interior 2a where an occupant (not illustrated) rides. A steering section 4, an acceleration operation section 5, a braking operation section 6, a speed change operation section 7, and the like are provided within the vehicle interior 2a in a state where a driver as the occupant is seated on a seat 2b. In the embodiment, for example, the steering section 4 is a steering wheel protruding from a dashboard (instrument panel) and the acceleration operation section 5 is an accelerator pedal positioned below the feet of the driver. In addition, the braking operation section 6 is a brake pedal positioned below the feet of the driver and the speed change operation section 7 is a shift lever protruding from a center console. However, these are not limited to the embodiment.

In addition, a display device 8 (display output section) and a sound output device 9 (sound output section) are provided within the vehicle interior 2a. The display device 8 is, for example, a liquid crystal display (LCD), an organic electroluminescent display (OELD), and the like. The sound output device 9 is, for example, a speaker. In addition, in the embodiment, for example, the display device 8 is covered by a transparent operation input section 10 (for example, a touch panel and the like). The occupant and the like can visually recognize a video (image) displayed on a display screen of the display device 8 via the operation input section 10. In addition, the occupant and the like can execute an operation input (instruction input) by operating the operation input section 10 by coming into contact with, pressing, or moving the operation input section 10 with the finger or the like in a position corresponding to the video (image) displayed on the display screen of the display device 8. In addition, in the embodiment, for example, the display device 8, the sound output device 9, the operation input section 10, and the like are provided in a monitor device 11 positioned at a center portion of the dashboard in a vehicle width direction (right and left direction). The monitor device 11 can have an operation input section (not illustrated) such as switches, dials, joysticks, and push buttons. In addition, a sound output device (not illustrated) can be provided in a position within the vehicle interior 2a different from the position of the monitor device 11 and sound can be output from the sound output device 9 of the monitor device 11 and another sound output device. In addition, in the embodiment, for example, the monitor device 11 is also used as a navigation system and an audio system, but the monitor device for the vehicle circumference monitoring apparatus may be provided separately from these systems.

Figure 2:
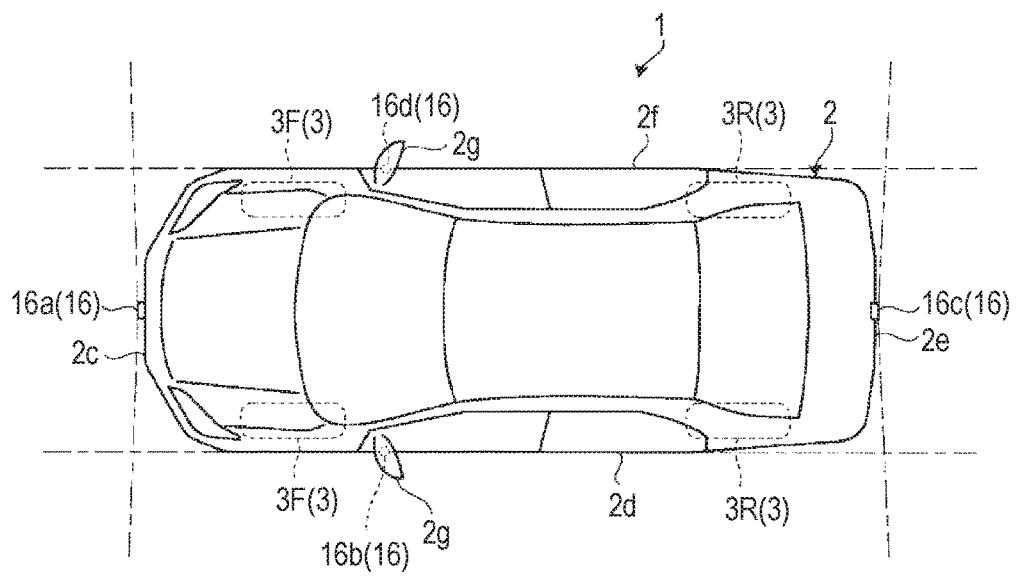
FIG. 2 is a plan view (overhead view) illustrating an example of the vehicle on which the vehicle circumference monitoring apparatus according to the embodiment is mounted.
Figure 3:
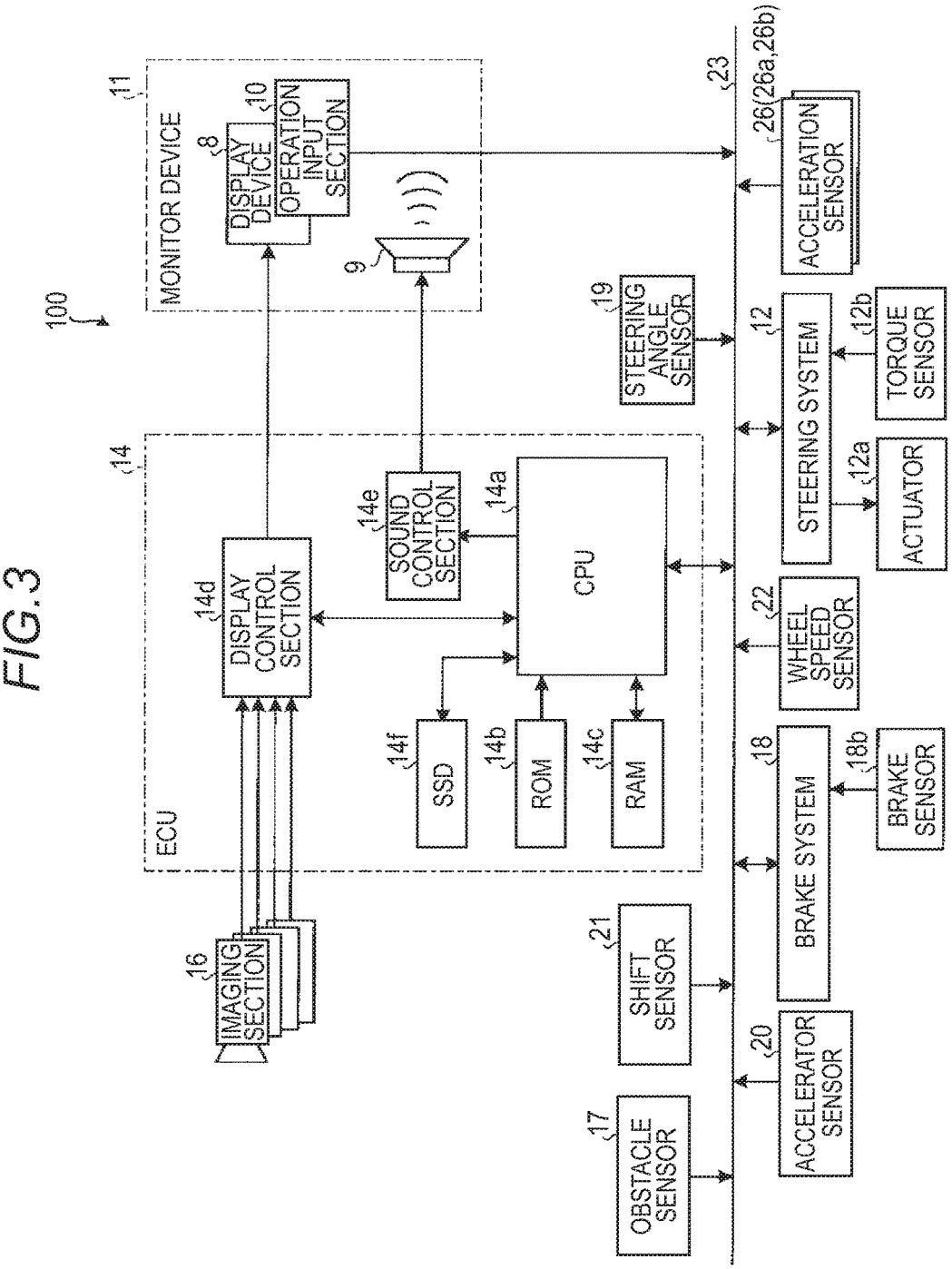
FIG. 3 is a block diagram illustrating an example of an image control system including the vehicle circumference monitoring apparatus according to the embodiment.

In addition, as illustrated in FIGS. 1 and 2, in the embodiment, for example, the vehicle 1 is a four-wheel vehicle (four-wheel car) and has two right and left front wheels 3F and two right and left rear wheels 3R. Then, for example, a tire angle of the front wheel 3F is changed (steered) in compliance with an operation of the steering section 4 (steering wheel). A steering system 12 (see FIG. 3) is, for example, an electric power steering system, a steer by wire (SBW) system, and the like. As illustrated in FIG. 3, the steering system 12 compensates a steering force by adding torque (assist torque) to the steering section 4 by an actuator 12a and steers the front wheels 3F.

In addition, in the embodiment, for example, as illustrated in FIG. 2, a plurality (for example, four in the embodiment) of imaging sections 16 (16a to 16d) are provided in the vehicle 1 (vehicle body 2). The imaging section 16 is a digital camera in which an imaging device such as a charge coupled device (CCD) and a CMOS image sensor (CIS) is built. The imaging section 16 can output captured image data (moving image data and frame data) at a predetermined frame rate. The imaging sections 16 respectively have a wide-angle lens and can image (capture an image) an image, for example, at a range (viewing angle) of 140° to 220° in the horizontal direction. In addition, an optical axis of the imaging section 16 is set downward (for example, a vertical direction or an obliquely downward direction). Thus, the imaging section 16 can image an environment of the outside of the circumference of the vehicle body 2 including a road surface on which the vehicle 1 is able to move and a region above the road surface.

In the embodiment, for example, the imaging section 16a functioning as a first imaging section is positioned in an end portion 2c (end portion in a plan view) of a front side (front side in a longitudinal direction of the vehicle) of the vehicle body 2 and is provided on a front grill and the like. The imaging section 16b functioning as a second imaging section is positioned in an end portion 2d of a left side (left side in the vehicle width direction) of the vehicle body 2 and is provided on a door mirror 2g (protrusion portion) of the left side. In addition, the imaging section 16c functioning as the first imaging section is positioned in an end portion 2e on a rear side (rear side in the longitudinal direction of the vehicle) of the vehicle body 2 and is provided on a wall portion below a door 2h of a rear trunk. The imaging section 16d functioning as the second imaging section is positioned in an end portion 2f of a right side (right side in the vehicle width direction) of the vehicle body 2 and is provided on the door mirror 2g (protrusion portion) of the right side. In addition, in the embodiment, a mounting method of the camera is not limited and may be provided so as to acquire captured image data in a front direction, captured image data in a right-left side direction, and captured image data in a rear direction with respect to the vehicle 1.

An electronic control unit (ECU; see FIG. 3) 14 executes a calculating process and an imaging process based on the captured image data acquired by the plurality of the imaging sections 16 and displays the captured image data in which the imaging process is performed on the display device 8. Moreover, for example, the captured image data that is imaged by the imaging section 16a imaging (capturing) the front of the vehicle is used as a current image indicating a situation of a current circumference of the vehicle as it is.

In addition, in the embodiment, for example, as illustrated in FIG. 3, in a circumference monitoring system (vehicle circumference monitoring apparatus) 100, an obstacle sensor 17, a brake system 18, a steering angle sensor 19 (angle sensor), an accelerator sensor 20, a shift sensor 21, a wheel speed sensor 22, an acceleration sensor 26, and the like are electrically connected via an in-vehicle network 23 (electric communication line) in addition to the ECU 14, the monitor device 11, and the like. The in-vehicle network 23 is configured as, for example, a controller area network (CAN). The ECU 14 can control the brake system 18 and the like by transmitting a control signal through the in-vehicle network 23. Furthermore, the ECU 14 can receive detection results of a torque sensor 12b, the obstacle sensor 17, a brake sensor 18b, the steering angle sensor 19, the accelerator sensor 20, the shift sensor 21, the wheel speed sensor 22, the acceleration sensor 26, and the like via the in-vehicle network 23. In addition, the ECU 14 can receive instruction signals (a control signal, an operation signal, an input signal, and data) of the operation input section 10 and the like.

In the embodiment, two acceleration sensors 26 (26a and 26b) are provided in the vehicle 1. Moreover, in the embodiment, the vehicle 1 is a vehicle on which an electronic stability control (ESC) is mounted. Then, the acceleration sensors 26 (26a and 26b) of the related art mounted on the vehicle on which the ESC is mounted are used. Moreover, in the embodiment, the acceleration sensor is not limited and a sensor that is able to detect the acceleration of the vehicle 1 in the right and left direction may be used. In the embodiment, the acceleration in a forward and rearward direction and the acceleration in a rightward and leftward direction are derived.

The ECU 14 has, for example, a central processing unit (CPU) 14a, a read only memory (ROM) 14b, a random access memory (RAM) 14c, a display control section 14d, a sound control section 14e, a solid state drive (SSD, flash memory) 14f, and the like. The CPU 14a executes the imaging process associated with an image displayed on the display device 8, and various calculating processes such as calculation of a moving path of the vehicle 1, and determination of the presence or absence of interference with an object. The CPU 14a reads a program stored (installed) in a non-volatile storage device such as the ROM 14b and executes the calculating process in compliance with the related program.

The RAM 14c temporarily stores various kinds of data that are used in the calculation in the CPU 14a. In addition, the display control section 14d mainly executes the imaging process using the captured image data obtained by the imaging section 16, the imaging process (for example, synthesizing and the like) of the captured image data displayed on the display device 8, and the like in the calculating process in the ECU 14. In addition, the sound control section 14e mainly executes a process for sound data output from the sound output device 9 in the calculation process in the ECU 14. In addition, the SSD 14f is a rewritable non-volatile storage section and can store data even if a power supply of the ECU 14 is turned off. Moreover, the CPU 14a, the ROM 14b, the RAM 14c, and the like can be integrated within the same package. In addition, the ECU 14 may be a configuration in which other logical calculation processors such as a digital signal processor (DSP), a logical circuit, and the like are used instead of the CPU 14a. In addition, a hard disk drive (HDD) may be provided instead of the SSD 14f and the SSD 14f or the HDD may be provided separately from the ECU 14.

Figure 4:
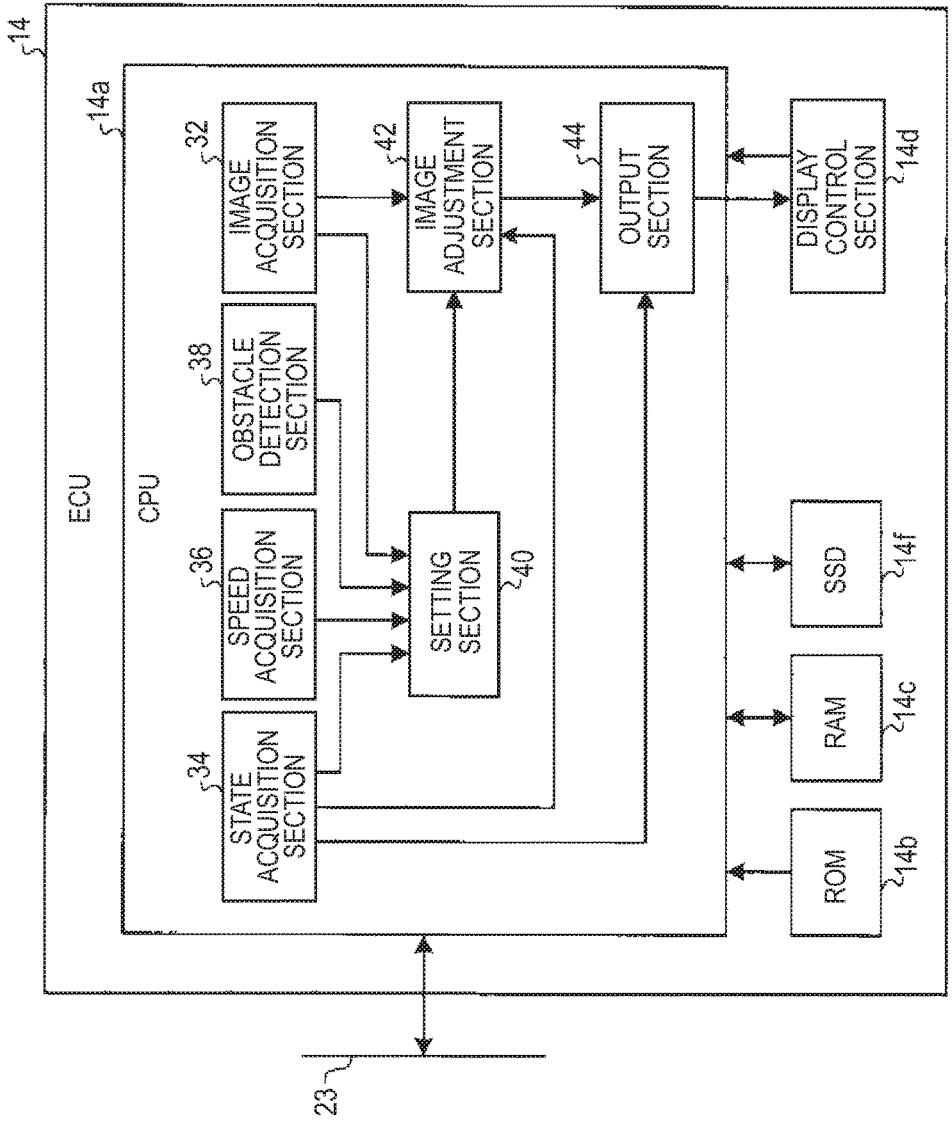
FIG. 4 is a block diagram illustrating a configuration of an image processing section that is realized within an ECU of the vehicle circumference monitoring apparatus according to the embodiment.

As illustrated in FIG. 4, the CPU 14a includes various modules that read programs installed and stored in a storage device such as the ROM 14b, and are realized by executing the programs. The CPU 14a includes, for example, an image acquisition section 32, a state acquisition section 34, a speed acquisition section 36, an obstacle detection section 38, a setting section 40, an image adjustment section 42, an output section 44, and the like.

The image acquisition section 32 acquires the image that is captured by the imaging section 16 via the display control section 14d. The case of the embodiment, an example, in which the imaging process is performed by acquiring the front image of the vehicle 1 that is mainly captured by the imaging section 16a, is described, but it is possible to display images on the display device 8 by acquiring side images of the vehicle 1 captured by the imaging sections 16b and 16d, a rear image of the vehicle 1 captured by the imaging section 16c, and the like, and performing the imaging process as necessary. The image acquisition section 32 supplies the acquired captured image data to the setting section 40 and the image adjustment section 42. Moreover, if the captured image data that is captured by the imaging section 16 is displayed by executing a simple imaging process, is displayed without executing the imaging process, is superimpose-displayed by other data, and the like, the process is performed by the display control section 14d and the display control section 14d may cause the display device 8 to display the captured image data.

The state acquisition section 34 supplies an inclined angle (roll angle and pitch angle) of the vehicle 1 to the setting section 40 by calculating the inclined angle based on acceleration data detected by the acceleration sensors 26a and 26b supplied via the in-vehicle network 23. That is, the acceleration sensor 26 functions as a vehicle state detection section that outputs the vehicle state data. Moreover, the roll angle is an angle indicating inclination of a circumference of a front and rear axis of the vehicle 1 and the pitch angle is an angle indicating inclination of a circumference of a right and left axis of the vehicle 1. Moreover, the state acquisition section 34 may supply information of the roll angle or the pitch angle to display a posture of the vehicle 1 by a posture symbol described below to the output section 44.

The speed acquisition section 36 supplies a vehicle speed of the vehicle 1 to the setting section 40 by calculating the vehicle speed based on a wheel speed detected by the wheel speed sensor 22 supplied via the in-vehicle network 23. It is sufficient that the speed acquisition section 36 can acquire the vehicle speed of the vehicle 1 and may calculate the vehicle speed based on information other than that from the wheel speed sensor 22.

The obstacle detection section 38 supplies information on whether or not the obstacle is presented in the circumference of the vehicle 1 based on information supplied via the in-vehicle network 23, for example, from the obstacle sensor 17 and information of a distance to the obstacle by calculating the distance to the obstacle if the obstacle is presented to the setting section 40. The obstacle sensor 17 may, for example, be sonar to capture a reflected wave by emitting an ultrasonic wave. The sonar is also referred to as a sonar sensor or an ultrasonic detector. Moreover, the obstacle detection section 38 extracts the obstacle present in the image by using a technique such as pattern matching by using the captured image data captured by the image acquisition section 32 or calculating a position on an image coordinate system, and thereby may detect (estimate) the presence of the obstacle or the distance to the obstacle.

If the display image is displayed on the display device based on the captured image data acquired by the image acquisition section 32, the setting section 40 sets the center of rotation that is used to rotate the display image depending on the roll state of the vehicle 1. Specifically, the setting section 40 determines whether or not a rotating process of the captured image data is necessary based on the roll state of the vehicle 1 supplied from the state acquisition section 34. In addition, the setting section 40 determines the position of the center of rotation based on the speed of the vehicle 1 supplied from the speed acquisition section 36 or the distance to the obstacle supplied from the obstacle detection section 38 if the captured image data is rotated. Specific examples of setting of the center of rotation by the setting section 40 will be described below.

The image adjustment section 42 rotates a display state of the front image of the vehicle 1 supplied from the image acquisition section 32 at an angle corresponding to the roll angle of the vehicle 1 detected by the state acquisition section 34 about the center of rotation set by the setting section 40. The image adjustment section 42 supplies the front image of the vehicle 1 in which the rotating process is executed to the output section 44. The output section 44 sequentially outputs the front images of the vehicle 1 in which the rotating process is executed to the display control section 14d. Moreover, here, since the rotating process in the image adjustment section 42 can be executed by coordinate conversion by using, for example, a known matrix, detailed description of the rotating process will be omitted. In addition, the output section 44 outputs information from the state acquisition section 34, that is, the roll angle or the pitch angle of the vehicle 1 to the display control section 14d.

The display control section 14d outputs the posture symbol of the vehicle 1, auxiliary lines indicating a relationship between the vehicle 1 and the circumference, and the like to the display device 8 by synchronizing the posture symbol of the vehicle 1, the auxiliary lines indicating the relationship between the vehicle 1 and the circumference, and the like, based on the front image of the vehicle 1 output from the output section 44, the side images of the vehicle 1 supplied from the imaging sections 16b and 16d, and the roll state (roll angle) or the pitch state (pitch angle) of the vehicle 1 obtained via the output section 44. Moreover, each module realized within the CPU 14a may be individually configured for each function as described above, or a plurality of functions may be realized in one module by putting together the functions. In contrast, it may be realized by further subdividing the functions.

Figure 5:
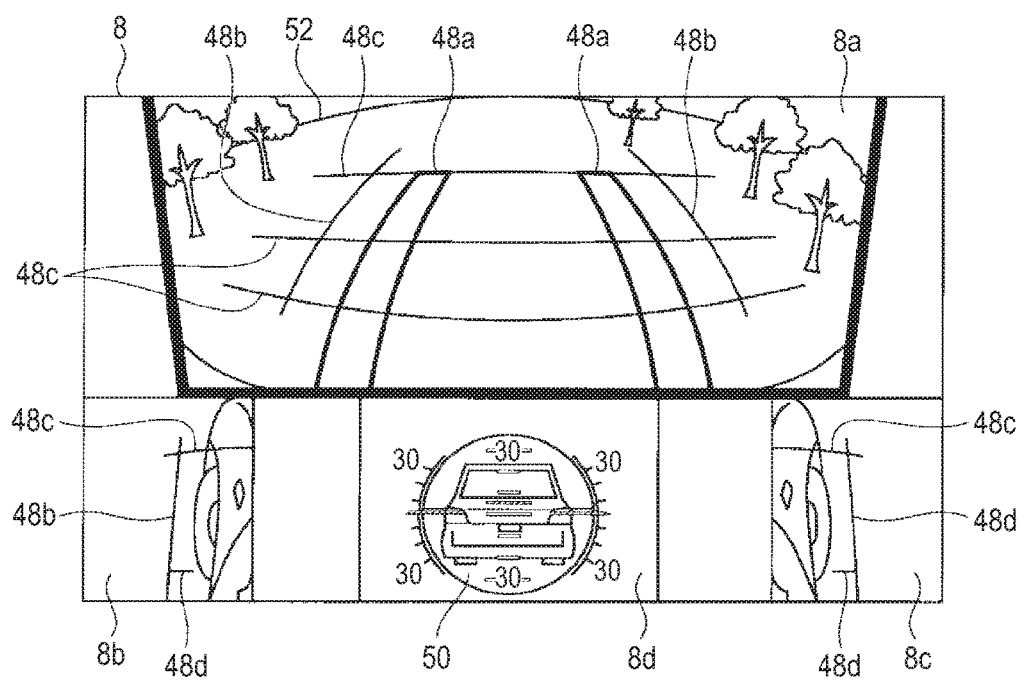
FIG. 5 is an example of a display image in the vehicle circumference monitoring apparatus according to the embodiment and a display example illustrating a display state of a case where a vehicle is not inclined.

FIG. 5 illustrates a display example of the display device 8. FIG. 5 illustrates a case where both the roll angle and the pitch angle of the vehicle 1 are "0°", that is, a case where the vehicle 1 is presented on a flat road. The display device 8 includes a front display region 8a, a left-side display region 8b, a right-side display region 8c, and a posture symbol display region 8d. The front display region 8a is a display region of the image based on the captured image data mainly captured by the imaging section 16a and is set in a wide range in an upper stage including a center of the display region of the display device 8. In the front display region 8a, front wheel path indicators 48a, vehicle width reference lines 48b, front reference lines 48c, and the like are displayed to overlap the front image captured by the imaging section 16a. The front wheel path indicators 48a display a travel estimated direction of the vehicle 1 (front wheels 3F) based on, for example, a steering angle of the front wheels 3F that can be acquired from the steering angle sensor 19. The vehicle width reference lines 48b are superimpose-displayed so as to indicate a predetermined margin distance from the vehicle width of the vehicle 1, for example, a position offset 0.5 m on the side of the vehicle based on the vehicle width of the vehicle 1. In addition, the front reference lines 48c are superimposed lines based on the end portion 2c of the front of the vehicle 1 and a plurality of the front reference lines 48c are displayed for each predetermined distance so as to easily image a distance between the vehicle and the object of the front of the vehicle on the front display region 8a. Moreover, the display region of the front display region 8a can be also used as a rear display region. For example, if the speed change operation section 7 (shift lever) is moved to a position of "R: reverse", the front display region 8a is switched to the rear image captured by the imaging section 16c and driving support may be performed when the vehicle 1 travels backward. Also in this case, rear wheel path indicators, the vehicle width reference lines, rear reference lines, and the like may be superimpose-displayed.

The circumference of the front wheels 3F is displayed as the side images of the vehicle 1 and the vehicle width reference lines 48b, the front reference lines 48c, grounding lines 48d indicating grounding positions of the front wheels 3F, and the like are also superimpose-displayed in the left-side display region 8b and the right-side display region 8c. It is possible to easily grasp the relationship between the position of the vehicle 1 and the circumference by superimpose-displaying reference lines such as the front wheel path indicators 48a, the vehicle width reference lines 48b, the front reference lines 48c, and the grounding lines 48d on the image of the vehicle 1.

A posture symbol 50 indicating a state of the vehicle 1 viewed from the rear side is displayed in the posture symbol display region 8d and the posture of the posture symbol 50 is changed depending on the roll angle and the pitch angle calculated by the state acquisition section 34. As a result, it is possible to easily support the user to objectively and easily understand the posture of the vehicle 1.

Figure 6:
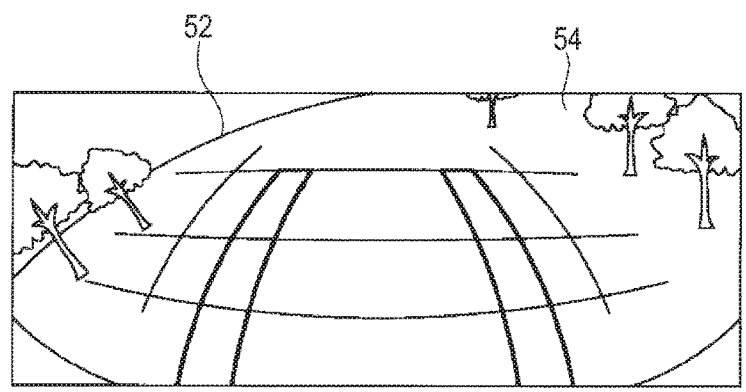
FIG. 6 is an example of a captured image that is captured by an imaging section when the vehicle on which the vehicle circumference monitoring apparatus according to the embodiment is mounted is inclined.
Figure 7:
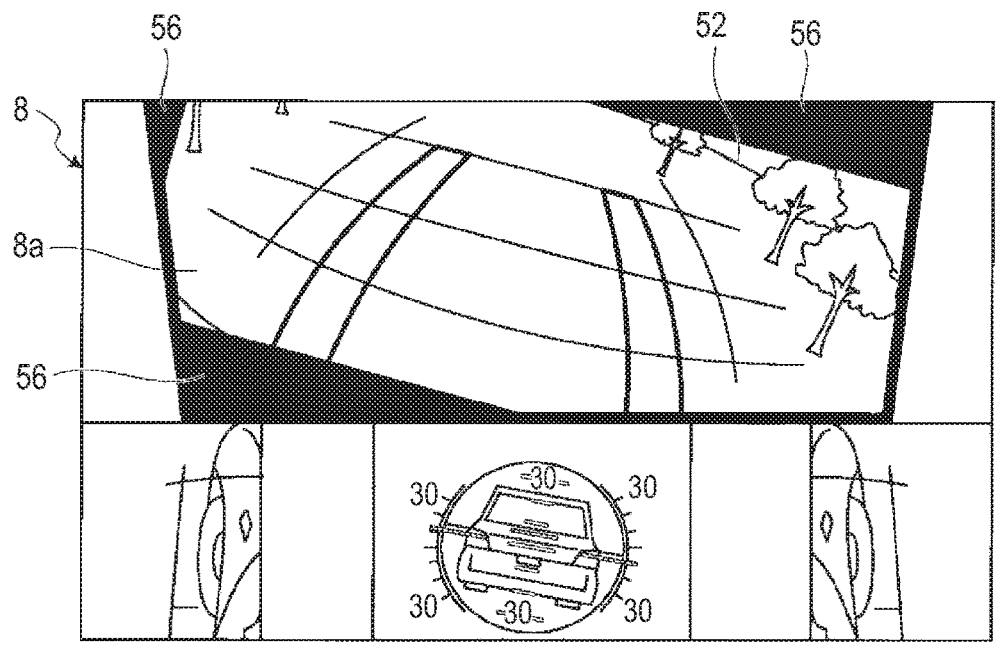
FIG. 7 is an example of the display image in the vehicle circumference monitoring apparatus according to the embodiment and is a display example illustrating a display state of a case where an image, which is captured in a state where the vehicle is inclined, is rotated to be horizontal.

Here, as the state of the vehicle 1, a case may be considered that the wheel 3 of the vehicle 1 on one side rides on stone or a protrusion of the road surface. In this case, the vehicle 1 is included and the imaging sections 16 fixed to the vehicle 1 are also included together with the vehicle 1. For example, a case may be considered that the wheel 3 of the vehicle 1 on the left side rides on the protrusion and the vehicle 1 is rolled on the right side. In this case, for example, the captured image data captured by the imaging section 16a is temporarily stored in the storage section such as the RAM 14c and the captured image data is stored in the storage section by using an absolute coordinate system. As a result, for example, as illustrated in FIG. 6, a captured image 54 in a state where a horizon 52 is inclined is stored. That is, if the captured image data (captured image 54) is displayed on the front display region 8a as it is, the horizon 52 is displayed in a state of being inclined. Furthermore, the image displayed on the front display region 8a is displayed so as to be inclined in a direction opposite to an actual inclination direction of the vehicle 1. Thus, uncomfortable feeling may be given to the user. Then, if the captured image data, which is captured in a state where the vehicle 1 is inclined, is displayed on the display device 8, it is desirable that rotational correction is performed depending on the inclined state of the vehicle 1 and the state of the vehicle 1 is displayed on the front display region 8a such that the horizon 52 is along, for example, an edge of the front display region 8a in the horizontal direction. FIG. 7 is an example in which the captured image data is displayed on the front display region 8a after the rotational correction of the captured image data is performed depending on the inclined state of the vehicle 1 if the vehicle 1 is inclined. Moreover, for the imaging section 16a of the embodiment, since an imaging range is a range corresponding to a display range of the front display region 8a, if the inclined image is displayed by being rotation-processed, a missing region 56, in which data is not present, is present. Furthermore, since for example, the imaging section 16a uses the wide-angle lens, the horizon 52 is displayed so as to be curved. As described above, also in the captured image data captured in the inclined state, it is possible to display an image equal an image that is visibly recognized by the user on the windshield on the display device 8 by performing the rotational correction based on the inclined angle (roll angle) of the vehicle 1. Moreover, in a case where the image is displayed on the front display region 8a by causing the imaging range of the imaging section 16a to be greater than the front display region 8a, if a clipping process of the image is performed, the missing region 56 may not be occur.

Figure 8:
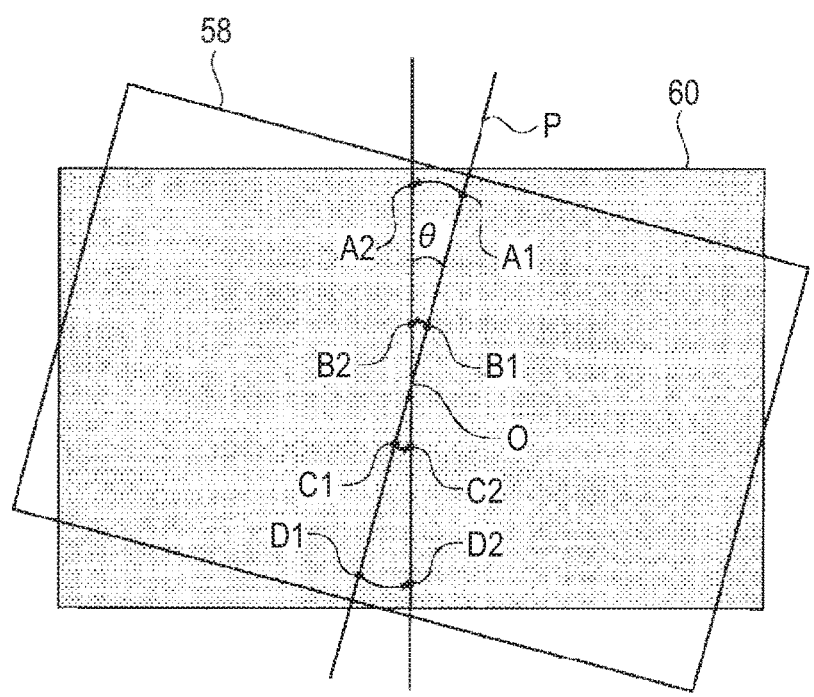
FIG. 8 is an explanatory view showing a moving state of attention points if the captured image is rotated substantially in a center position on a vertical axis passing through a center position of a display region in a display width direction.

Meanwhile, if the captured image data that is captured by the imaging section 16 and the like is rotation-processed, it may be considered that the captured image data is rotated about the lens. FIG. 8 is a view showing a state transition in a case where a first image 58 that is inclined at an angle θ is rotation-processed by the angle θ in a counter-clockwise direction and is converted into a second image 60. That is, FIG. 8 is an explanatory view showing a moving state of attention points A1, B1, C1, and D1 if the image, which is captured by being inclined, is rotated substantially in a center position (rotational center O) on a vertical axis P passing through a center position in the display width direction of the display region. As illustrated in FIG. 8, the attention point A1 and the attention point D1 present at positions far from the rotational center O are moved to a display point A2 and a display point D2 by the rotation of the angle θ. Similarly, the attention point B1 and the attention point C1 present at positions close to the rotational center O are moved to a display point B2 and a display point C2 by the rotation of the angle θ. However, if the rotating process is performed, a moving amount due to the rotating process of the attention point A1 and the attention point D1 far from the rotational center O is greater than that of the attention point B1 and the attention point C1 close to the rotational center O. In other words, the moving amount of the object far from the vehicle 1 on the screen becomes large by the rotating process that is performed to correct the inclination of the display image. For example, there is a concern that the obstacle actually positioned at a position shifted in a traveling direction of the vehicle 1 is displayed so as to be positioned at a front position of the vehicle 1 by the rotating process. In this case, there is a concern that the user erroneously recognizes the position of the obstacle and avoidance maneuver of the obstacle, which is actually not required, may be performed. Similarly, the moving amount of the obstacle close to the vehicle 1 becomes large on the screen and similarly, it may be a cause of erroneous recognition of the user.

Thus, the circumference monitoring system 100 of the embodiment estimates an attention region that can be viewed if the user pays attention on the front display region 8a and performs the rotating process of the inclined image that is the captured image 54 such that the moving amount of the object is small in the attention region. The estimation of the attention region on the front display region 8a can be performed, for example, based on the speed of the vehicle 1. For example, if the vehicle 1 is driven at a low speed, it may be considered that the driver drives vehicle while paying attention a situation of the circumference of the vehicle 1. That is, it can be considered that the attention region is presented in the lower region of the front display region 8a that is a side close to the vehicle 1 on the front display region 8a.

Figure 9:
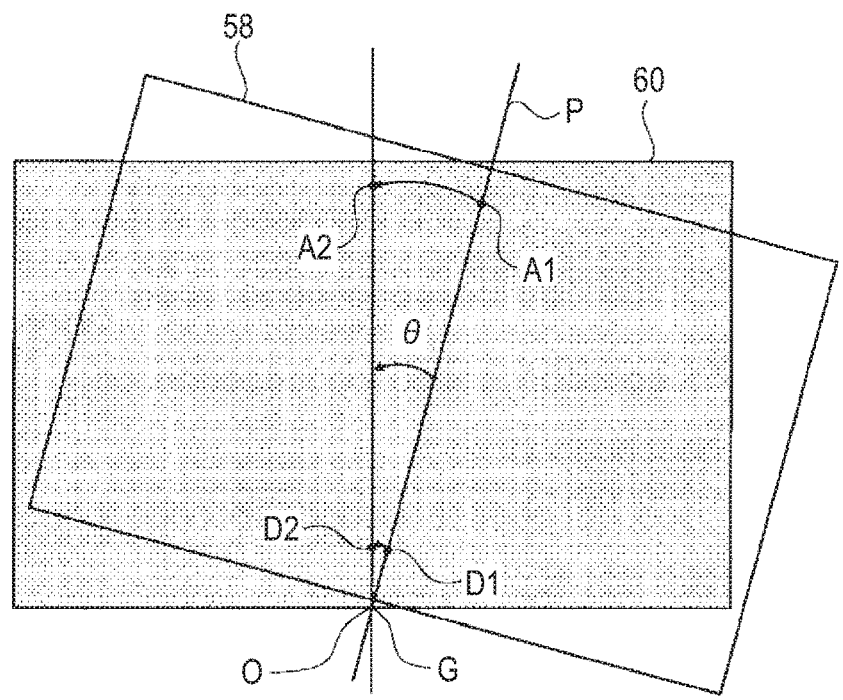
FIG. 9 is an explanatory view showing a moving state of the attention points if the captured image is rotated in a lower position on the vertical axis passing through the center position of the display region in the display width direction.

In this case, the setting section 40 sets the center of rotation at a position close to a lower side on the vertical axis passing through the center position of the display region in the display width direction based on the vehicle speed obtained from the speed acquisition section 36. FIG. 9 is a view showing that the moving amount of the object is reduced even if the rotating process of the display image is executed in the lower side of the display region that is the attention region, that is, the region displaying the position close to the front of the vehicle 1 in a case where the center of rotation is set at the position close to the lower side of the display region on the vertical axis passing through the center position in the display width direction of the display region. As illustrated in FIG. 9, the rotational center O is set on the lower side on the vertical axis P passing through the center position in the display width direction of the display region, for example, at a lowermost end position G. Moreover, the rotational center O is set at the lowermost end position G, for example, when the "vehicle speed is 0 km/h". Then, the inclined first image 58 can be corrected to the horizontal second image 60 by performing the rotating process, for example, by the angle θ° about the rotational center O. In this case, the attention point D1 present in the attention region is moved to the display point D2, but the moving amount is very small. That is, in the captured image data actually displayed on the front display region 8a, even if the rotating process is performed depending on the inclined angle (roll angle), the rotational center O is set at the position on the lower side on the vertical axis P of the front display region 8a when the vehicle speed of the vehicle 1 is low. As a result, as illustrated in FIG. 7, even if the rotating process is performed such that the horizon 52 is along the edge of the front display region 8a in the horizontal direction, the moving amount of the object is small in the attention region close to the front of the vehicle 1 and as described above, erroneous recognition of the user can be suppressed.

In contrast, if the vehicle 1 is driven at a certain speed, for example, equal to or greater than 20 km/h, it is considered that the driver is likely to drive the vehicle 1 by gazing at an object far from the vehicle 1. That is, it can be considered that the attention region is presented in the upper side of the front display region 8a that is a side far from the vehicle 1 on the front display region 8a.

Figure 10:
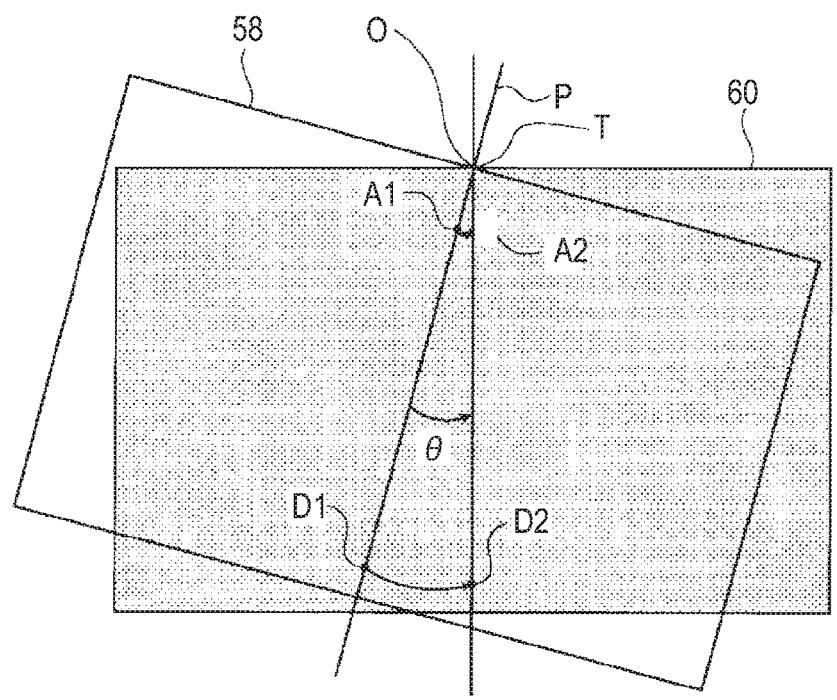
FIG. 10 is an explanatory view showing a moving state of the attention points if the captured image is rotated in an upper position on the vertical axis passing through the center position of the display region in the display width direction.

In this case, the setting section 40 sets the center of rotation at the position close to the upper side on the vertical axis passing through the center position of the display region in the display width direction based on the vehicle speed obtained from the speed acquisition section 36. FIG. 10 is a view showing that the moving amount of the object is reduced even if the rotating process of the display image is executed in the upper side of the display region that is the attention region, that is, the region displaying the position far from the front of the vehicle 1 in a case where the center of rotation is set at the position close to the upper side of the display region on the vertical axis passing through the center position in the display width direction of the display region. As illustrated in FIG. 10, the rotational center O is set on the upper side on the vertical axis P passing through the center position in the display width direction of the display region, for example, at an uppermost end position T. Then, the inclined first image 58 can be corrected to the horizontal second image 60 by performing the rotating process, for example, by the angle θ° about the rotational center O. In this case, the attention point A1 present in the attention region is moved to the display point A2, but the moving amount is very small. That is, even if the rotating process is actually performed on the captured image data displayed on the front display region 8a depending on the inclined angle (roll angle), the rotational center O is set at the position on the upper side on the vertical axis P of the front display region 8a when the vehicle speed of the vehicle 1 is output at a certain degree (equal to or greater than a certain degree). As a result, as illustrated in FIG. 7, even if the rotating process is performed such that the horizon 52 is along the edge of the front display region 8a in the horizontal direction, the moving amount of the object is small in the attention region far from the front of the vehicle 1 and as described above, erroneous recognition of the user can be suppressed.

Figure 11:
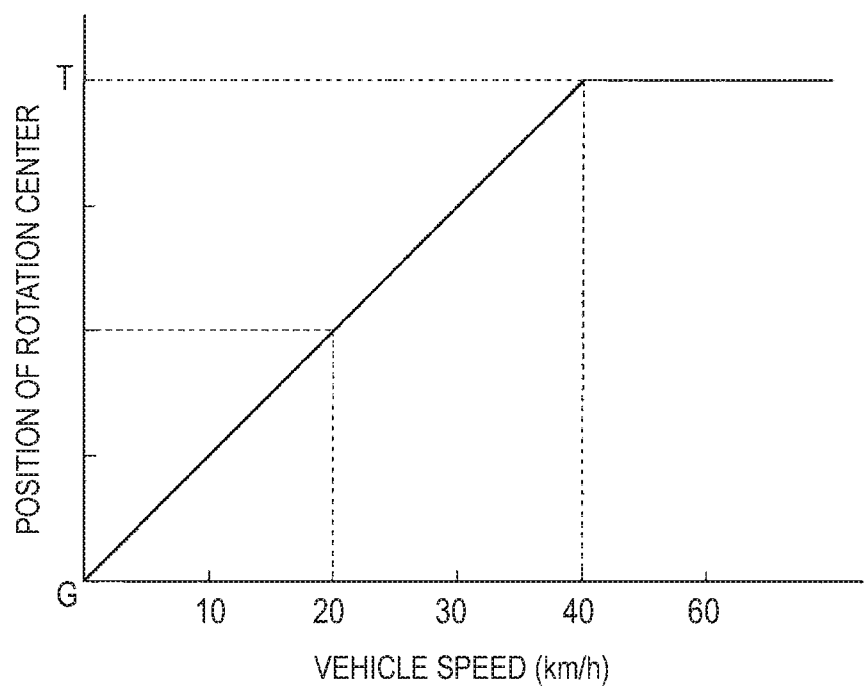
FIG. 11 is an example of a setting map that is referred to by a setting section of the vehicle circumference monitoring apparatus according to the embodiment.

Moreover, a setting position of the rotational center O by the setting section 40 is, for example, as illustrated in FIG. 11, can be uniquely determined by a "setting map of a speed reference" determining a relationship between the vehicle speed and the position of the rotational center O on the vertical axis P. For example, the lowermost end position G of the vertical axis P is referred to as the "vehicle speed is 0 km/h". In addition, substantially the center portion of the vertical axis P is referred to as the "vehicle speed is 20 km/h" and a position of the rotational center O lower than the center portion of the vertical axis P is assigned between "0 km/h to 20 km/h". For example, the uppermost end position T of the vertical axis P is referred to as the "vehicle speed is 40 km/h". That is, if the vehicle speed exceeds 40 km/h, the rotational center O is constant and is in the uppermost end position T. Then, the position of the rotational center O equal to or higher than the center portion of the vertical axis P is assigned between "20 km/h to 40 km/h". As described above, the setting section 40 sets the position of the rotational center O with reference to the setting map and then a rapid rotating process of the display image can be realized. Moreover, in the example illustrated in FIG. 11, for example, a range of "0 km/h to 40 km/h" indicates an example in which the position of the rotational center O is linearly increased together with an increase in the vehicle speed, but a mode of the setting map of a speed reference can be appropriately set and may be increased by a convex curve on an upper side or a convex curve on a lower side thereof. In addition, the vehicle speed may be intermittently increased in a stepwise manner. In addition, either choices or multiple choices may be performed in which if the vehicle speed is equal to or lower than 20 km/h, the rotational center O is the lowermost end position G and if the vehicle speed is 20 km/h, the rotational center O is the uppermost end position T. In addition, the speed range is "0 km/h to 40 km/h", but may be appropriately changed. In addition, the setting section 40 may calculate the position of the rotational center O by calculation based on the vehicle speed without the setting map.

The setting section 40 can perform estimation of the attention region on the front display region 8a based on the obstacle present in front of the vehicle 1 supplied from the obstacle detection section 38 instead of the vehicle speed. For example, it is considered that the driver is likely to drive the vehicle 1 while paying attention the situation of the circumference of the vehicle 1 if the obstacle (for example, pedestrians, other vehicles, bicycles, and the like) is present in the circumference of the vehicle 1. That is, it can be considered that the attention region is present in the lower region of the front display region 8a that is the side close to the vehicle 1 on the front display region 8a. In contrast, it is considered that the driver is likely to drive the vehicle 1 while paying attention to the object far from the vehicle 1 if the obstacle is not present in the circumference of the vehicle 1 or if the obstacle (for example, pedestrians, other vehicles, bicycles, and the like) is present in the position far from the vehicle 1. That is, it can be considered that the attention region is present in the upper region of the front display region 8a that is the side far from the vehicle 1 on the front display region 8a. That is, it is possible to perform setting of the rotational center O depending on a distance to the obstacle with reference to the vehicle 1. For example, similar to a case where the rotational center O is set depending on the vehicle speed, for example, the lowermost end position G of the vertical axis P is referred to as the "distance is 0 m" in FIG. 9. In addition, substantially the center portion of the vertical axis P is, for example, referred to as the "distance is 20 m" and the position of the rotational center O lower than the center portion of the vertical axis P is assigned between "0 m to 20 m". In addition, as illustrated in FIG. 10, the uppermost end position T of the vertical axis P is, for example, the "distance is 40 m". That is, if the distance to the obstacle exceeds 40 m, the rotational center O is constant and is in the uppermost end position T. Then, the position of the rotational center O equal to or higher than the center portion of the vertical axis P is assigned between "20 m to 40 m". As described above, the setting section 40 sets the position of the rotational center O with reference to the setting map and then similar to the case of setting based on the vehicle speed, it is possible to realize the rapid rotating process of the display image.

Moreover, as described above, the detection of the obstacle may be executed based on information supplied from the obstacle detection section 38 or may be executed by using the captured image data supplied from the image acquisition section 32. In addition, it may be used by combining the both.

Moreover, in the case of the example illustrated in FIG. 9, the movement of the positions of the attention point D1 and the display point D2 present in the lower region on the vertical axis P is small, but the movement of the positions of the attention point A1 and the display point A2 present in the upper region on the vertical axis P is large. However, in this case, since the upper region on the vertical axis P is not the attention region to which the user pays attention, even if the moving amount of the object is large, the user is unlikely to erroneously recognize the object. Similarly, in the case of the example illustrated in FIG. 10, the movement of the positions of the attention point A1 and the display point A2 present in the upper region on the vertical axis P is small, but the movement of the positions of the attention point D1 and the display point D2 present in the lower region on the vertical axis P is large. However, in this case, since the lower region on the vertical axis P is not the attention region to which the user pays attention, even if the moving amount of the object is large, the user is unlikely to erroneously recognize the object.

As described above, an example, in which the setting section 40 determines the position of the rotational center O based on one of the vehicle speed of the vehicle 1 and the distance to the obstacle in the front of the vehicle 1 when setting the position of the rotational center O, is illustrated, but the position of the rotational center O may be set by using the both. In this case, it is possible to improve estimation accuracy of the attention region of the user. In addition, the setting section 40 may be configured such that the user can select whether setting of the position of the rotational center O is performed based on one of the vehicle speed and the distance to the obstacle by operating the operation input section 10. In addition, the setting section 40 may be configured such that the user can set the rotational center O to a desired position by operating the operation input section 10. In this case, customization by the user is improved.

Figure 12A:
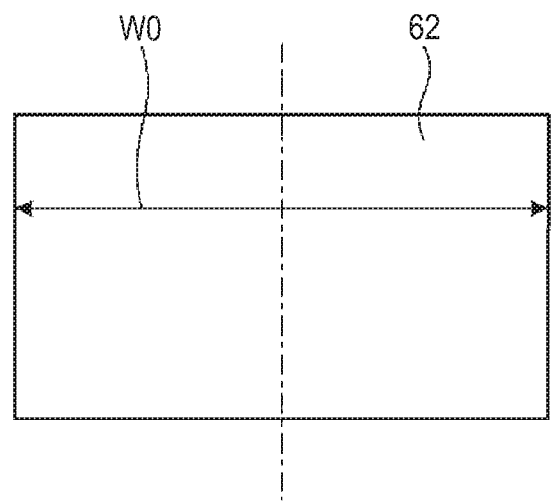
FIGS. 12A and 12B are views showing conversion of the display region of the vehicle circumference monitoring apparatus according to the embodiment.
Figure 12B:
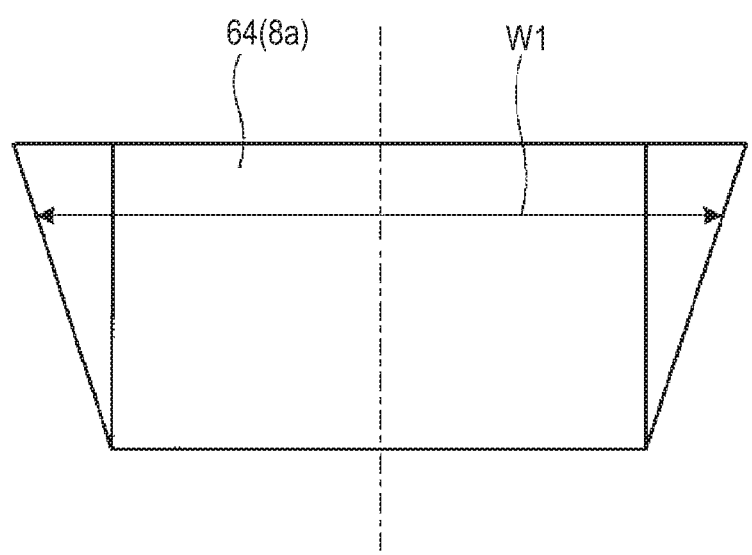

Meanwhile, as described above, the imaging section 16a includes the wide-angle lens that is able to acquire the image information of the wide range. In addition, as illustrated in FIG. 6, the display range that is defined by the captured image data captured by the imaging section 16a may be a rectangular shape. As described above, if the image captured by the wide-angle lens is displayed in a rectangular display range, the object present on the display image may be thin in a lateral width direction. Thus, the image adjustment section 42 of the embodiment includes a function of expanding and adjusting the display image in the display width direction if the display image is displayed on the display device 8. For example, a rectangular original display region 62 is corrected to a corrected display region 64 of a trapezoidal shape in which a display width W0 of the rectangular original display region 62 illustrated in FIG. 12A becomes a display width W1 that is formed by expanding an upper side of the display region as illustrated in FIG. 12B. As a result, it is possible to display the object that is thin for imaging by the wide-angle lens to be a state close to an actual object. It is possible to display the display image that is corrected depending on the posture of the vehicle 1 to be a state close to scenery in circumference of the vehicle that is actually and visually recognized by user on the windshield. That is, it is possible to contribute to the improvement of display quality. Moreover, in the case of FIG. 12B, as an example, the display region is the trapezoidal shape in which an upper base is long, but expansion and adjustment may be performed in the display width direction and, for example, the expansion and the adjustment may be performed such that the corrected display region 64 is a rectangular shape. In addition, the setting section 40 may estimate and determine positions of the expansion and the adjustment corresponding to the positions of the attention region.

Figure 13:
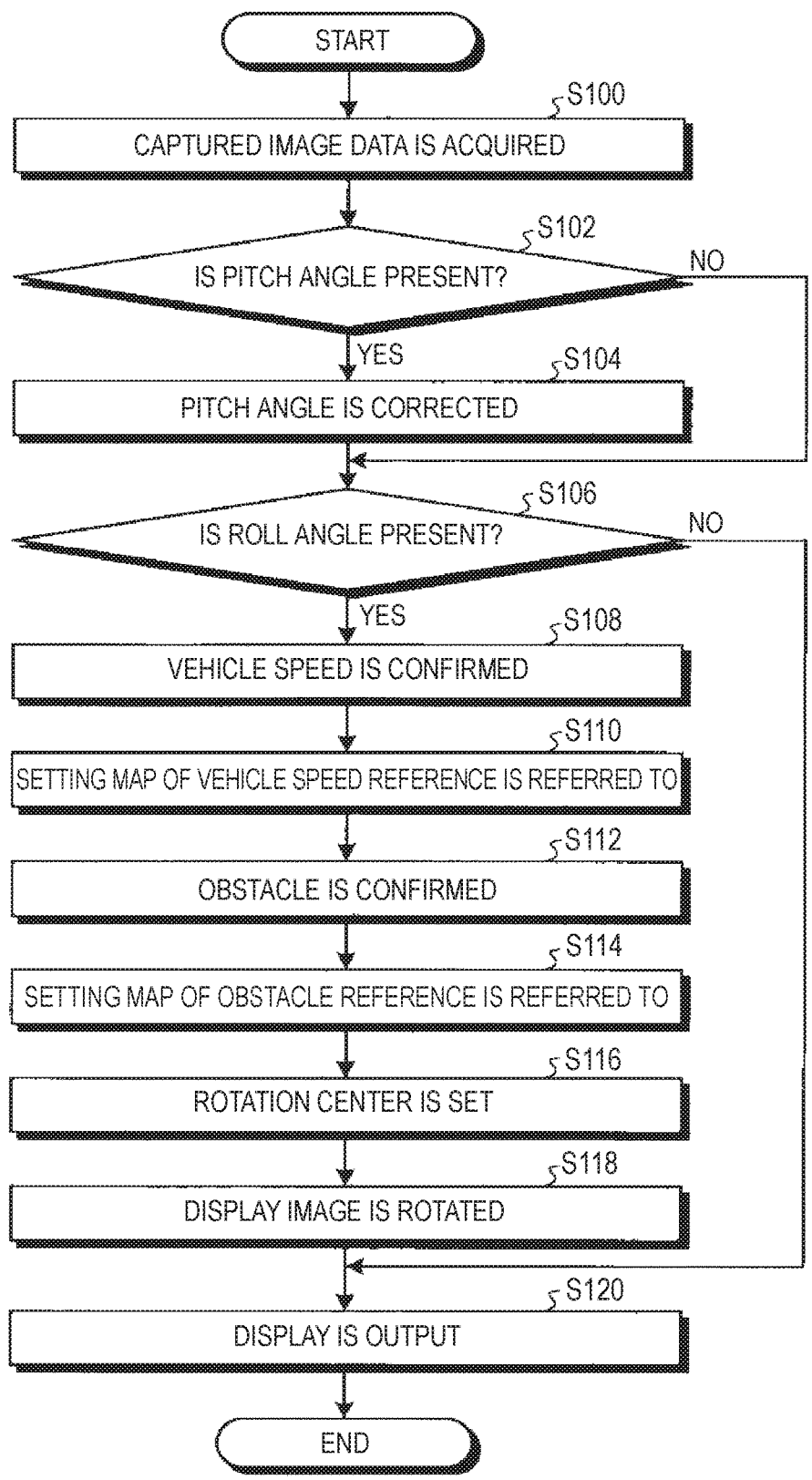
FIG. 13 is a flowchart showing a procedure of an imaging process of the vehicle circumference monitoring apparatus according to the embodiment.

An example of a procedure of the imaging process of the circumference monitoring system 100 having such a configuration is described by using a flowchart of FIG. 13. Moreover, the procedure indicated in the flowchart of FIG. 13 is repeated in a predetermined cycle when displaying the front display region 8a. In addition, when displaying the front display region 8a, at least the imaging section 16a, the acceleration sensor 26, the wheel speed sensor 22, the obstacle sensor 17, and the like continuously supply detected data to the ECU 14 in a predetermined period. In addition, at least the imaging section 16a is able to image a region of a predetermined amount greater than the front display region 8a.

If the display of the display device 8 including the front display region 8a is required, the ECU 14 causes the captured image data of the front of the vehicle 1 to be acquired by the image acquisition section 32 via the display control section 14d (step S100). Subsequently, the image adjustment section 42 performs the correction of the pitch angle regarding the captured image data displayed on the front display region 8a (step S104) if it is determined that the pitch angle is present (vehicle 1 is inclined in the forward and rearward direction) in the posture of the vehicle 1 based on information supplied from the state acquisition section 34 (Yes in S102). That is, since the front end of the vehicle 1 is inclined upward or inclined downward, if the center of the display image displayed on the front display region 8a is shifted and a standard position is shifted in the vertical direction, the deviation is corrected.

Subsequently, the setting section 40 confirms the vehicle speed via the speed acquisition section 36 (step S108), if it is determined that the roll angle is present (vehicle 1 is inclined in the vehicle width direction) in the posture of the vehicle 1 based on information supplied from the state acquisition section 34 (Yes in S106). The setting section 40 refers the setting map of the speed reference, for example, regarding the vehicle speed as illustrated in FIG. 11 (step S110) and temporarily determines the position of the rotational center O of the speed reference when executing the rotating process based on information from the speed acquisition section 36. In addition, the setting section 40 confirms the obstacle present in front of the vehicle 1 and the distance to the obstacle if there is the obstacle based on information from the obstacle detection section 38 (step S112). Then, the setting section 40 refers a setting map of an obstacle reference regarding the obstacle, for example, similar to FIG. 11 (step S114) and temporarily determines the position of the rotational center O of the obstacle reference when executing the rotating process. Then, the setting section 40 sets the position of the rotational center O that is used in the rotating process based on the position of the rotational center O of the temporarily determined speed reference and the position of the rotational center O of the obstacle reference (step S116).

The rotational center O that is set by the setting section 40 is supplied to the image adjustment section 42. In addition, the captured image data of the imaging section 16a from the image acquisition section 32 and the roll angle of the vehicle 1 from the state acquisition section 34 are supplied to the image adjustment section 42. Then, the image adjustment section 42 performs the rotating process of the captured image data supplied from the image acquisition section 32 by the roll angle θ° detected by the state acquisition section 34 about the rotational center O that is set by the setting section 40. That is, rotation of the display image displayed on the display device 8 is performed (step S118). Then, the image adjustment section 42 outputs a result of the rotating process to the display control section 14d via the output section 44. In addition, the output section 44 rotates and outputs the roll angle and the pitch angle detected by the state acquisition section 34 to the display control section 14d. In the display control section 14d, a display output of the front display region 8a and a display output of the side images captured by the imaging sections 16b and 16d are performed based on a result of the rotating process. In addition, a display output of the posture symbol 50 is performed in the posture symbol display region 8d based on the roll angle and the pitch angle of the vehicle 1. That is, the display output of the display device 8 is executed (step S120).

In S106, if the setting section 40 determines that the roll angle is not present in the posture of the vehicle 1 (No in S106), the sequence from S108 to S118 is skipped and the sequence of S120 is executed. In addition, in S102, if the setting section 40 determines that the pitch angle is not present in the posture of the vehicle 1 (No in S102), the sequence of S104 is skipped and the sequence of S106 and subsequent are executed. The ECU 14 executes the driving support on the user by displaying image information of the circumference of the vehicle 1 and posture information of the vehicle 1 on the display device 8 by executing the flow of FIG. 13 in a predetermined cycle. Moreover, the flowchart indicated in FIG. 13 is an example and if the display mode of the display device 8 can display the same image as a state where the user visually recognizes the image on the windshield, processing contents may be appropriately changed and it is possible to obtain the same effects as those of the embodiment.

In the embodiment, the center of rotation may be set based on the position of the obstacle. For example, the center of rotation of the display image in the vertical direction is set and the position of the obstacle may be centered (center of rotation) by moving the center of rotation in a lateral direction depending on the obstacle. In addition, the obstacle is detected from the captured image, the position of the obstacle is specified from the coordinate within the display image, and then the center of rotation may be set. In any case, it is possible to obtain the same effects as those of the above-described embodiment.

A vehicle circumference monitoring apparatus according to an aspect of this disclosure includes, for example, an image acquisition section that acquires captured image data output from an imaging section that is provided in a vehicle and images a circumference of the vehicle; a state acquisition section that acquires vehicle state data output from a vehicle state detection section that is provided in the vehicle and detects at least a roll state of the vehicle; a setting section that sets a center of rotation to rotate a display image depending on the roll state if the display image is displayed on a display device based on the captured image data; an image adjustment section that rotates a display state of the display image about the center of rotation that is set depending on the roll state; and an output section that outputs the display image to the display device. According to the configuration, for example, a moving amount of an object on the image is small in the vicinity of the center of rotation on the display image even if the image is rotated. That is, the position of the center of rotation of the image can be changed (can be set) depending on the situation and then it is possible to form an image region that is unlikely to receive influence of the rotation.

The setting section of the vehicle circumference monitoring apparatus may set, for example, the center of rotation at any position on a vertical axis passing through a center position of a display region of the display image in a display width direction. According to the configuration, for example, if the center of rotation is set at a position on an upper side on the vertical axis passing through the center position in the display width direction of the display region, it is possible to reduce the moving amount of the object present far from the front of the vehicle even if the image is rotated. In contrast, if the center of rotation is set at a position of a lower side on the vertical axis passing through the center position of the display region in the display width direction, it is possible to reduce the moving amount of the object present near the front of the vehicle even if the image is rotated. That is, it is possible to realize display in which the moving amount is small on the image by performing setting (setting of the position of the center of rotation) of the center of rotation depending on the position in which the object (the circumferential environment) is present to which a user wants to pay attention.

The setting section of the vehicle circumference monitoring apparatus may set, for example, the center of rotation on the vertical axis depending on a vehicle speed of the vehicle. According to the configuration, for example, if the vehicle speed is high, the user (driver) may often look at a far off distance. In this case, the center of rotation is set at the position on the upper side on the vertical axis passing through the center position of the display region in the display width direction. As a result, it is possible to reduce the moving amount of the object (circumferential environment) by the rotation of the image at a position of the far off distance that can be considered to be viewed by the user paying attention. In contrast, if the vehicle speed is low, the user (driver) may often look at the vicinity of the vehicle. In this case, the center of rotation is set at the position on the lower side on the vertical axis passing through the center position of the display region in the display width direction. As a result, it is possible to reduce the moving amount of the object (circumferential environment) by the rotation of the image at a position in the vicinity that can be considered to be viewed by the user paying attention.

The setting section of the vehicle circumference monitoring apparatus may set, for example, the center of rotation on the vertical axis depending on a distance to an obstacle present in the circumference of the vehicle. According to the configuration, for example, if the obstacle is in the far off distance, the user (driver) may often look at the far off distance. In this case, the center of rotation is set at the position on the upper side on the vertical axis passing through the center position of the display region in the display width direction. As a result, it is possible to reduce the moving amount of the object (circumferential environment) by the rotation of the image at a position of the far off distance that can be considered to be viewed by the user paying attention. In contrast, if the obstacle is in the vicinity of the vehicle, the user (driver) may often look at the vicinity of the vehicle. In this case, the center of rotation is set at the position on the lower side on the vertical axis passing through the center position of the display region in the display width direction. As a result, it is possible to reduce the moving amount of the object (circumferential environment) by the rotation of the image at the position in the vicinity that can be considered to be viewed by the user paying attention.

The image adjustment section of the vehicle circumference monitoring apparatus may expand and adjust, for example, the display image in the display width direction if the display image is displayed on the display device. If the image of the front of the vehicle is acquired, since it is desirable that information of a wide range is acquired, the imaging section may include a wide-angle lens. If the image is displayed on the display device as it is, there is a tendency that the image is elongated closer to the center position. If the display image is displayed on the display device, it is possible to approximate the display image to a real shape and it can be difficult to give an uncomfortable feeling to the user by expanding and adjusting the display image in the display width direction.

The state acquisition section of the vehicle circumference monitoring apparatus may further acquire, for example, the vehicle state data indicating a pitch state of the vehicle, and the image adjustment section may move the display image in the vertical direction depending on the pitch state. According to the configuration, for example, even if the vehicle is inclined in a forward and backward direction, it is possible to display the position to which the user pays attention on a display screen by eliminating the inclination.

The embodiment and the modification example of the invention are described, but the embodiment and the modification example are presented as examples, and are not intended to limit the scope of the invention. Theses novel embodiments are capable of being embodied in other various forms and various omissions, substitutions, and changes can be performed without departing from the scope of the invention. These embodiments or modifications are included in the scope or the gist of the invention, and are included in the invention described in the claim and equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle circumference monitoring apparatus comprising:
    a controller comprising at least one processor, wherein the controller acquires captured image data output from a camera that is provided in a vehicle and images a circumference of the vehicle;
    the controller acquires vehicle state data output from a sensor that is provided in the vehicle and detects at least a roll state of the vehicle;
    the controller sets a center of rotation to rotate a display image depending on the roll state if the display image is displayed on a display device based on the captured image data;
    the controller rotates a display state of the display image about the center of rotation that is set depending on the roll state;
    the controller outputs the display image to the display device; and
    wherein the controller sets the center of rotation at any position on a vertical axis passing through a center position of a display region of the display image in a display width direction depending on a distance to an obstacle present in the circumference of the vehicle.

2. The vehicle circumference monitoring apparatus according to claim 1,
    wherein the controller sets the center of rotation on the vertical axis depending on a vehicle speed of the vehicle.

3. The vehicle circumference monitoring apparatus according to claim 2,
    wherein the controller expands and adjusts the display image in the display width direction if the display image is displayed on the display device.

4. The vehicle circumference monitoring apparatus according to claim 1,
    wherein the controller expands and adjusts the display image in the display width direction if the display image is displayed on the display device.

5. The vehicle circumference monitoring apparatus according to claim 4,
    wherein the controller further acquires the vehicle state data indicating a pitch state of the vehicle, and
    wherein the controller moves the display image in a vertical direction depending on the pitch state.

6. The vehicle circumference monitoring apparatus according to claim 1,
    wherein the controller further acquires the vehicle state data indicating a pitch state of the vehicle, and
    wherein the controller moves the display image in a vertical direction depending on the pitch state.

7. A vehicle circumference monitoring apparatus comprising:
    a controller comprising at least one processor, wherein the controller acquires captured image data output from a camera that is provided in a vehicle and images a circumference of the vehicle,
    the controller acquires vehicle state data output from a sensor that is provided in the vehicle and detects at least a roll state of the vehicle,
    the controller sets a center of rotation to rotate a display image depending on the roll state if the display image is displayed on a display device based on the captured image data,
    the controller rotates a display state of the display image about the center of rotation that is set depending on the roll state,
    the controller outputs the display image to the display device,
    wherein the controller sets the center of rotation at any position on a vertical axis passing through a center position of a display region of the display image in a display width direction depending on a vehicle speed of the vehicle, and
    the controller expands and adjusts the display image in the display width direction if the display image is displayed on the display device.

8. The vehicle circumference monitoring apparatus according to claim 7,
    wherein the controller further acquires the vehicle state data indicating a pitch state of the vehicle, and
    wherein the controller moves the display image in a vertical direction depending on the pitch state.

9. A vehicle circumference monitoring apparatus comprising:
    a controller comprising at least one processor, wherein the controller acquires captured image data output from a camera that is provided in a vehicle and images a circumference of the vehicle,
    the controller acquires vehicle state data output from a sensor that is provided in the vehicle and detects at least a roll state of the vehicle,
    the controller sets a center of rotation to rotate a display image depending on the roll state if the display image is displayed on a display device based on the captured image data,
    the controller rotates a display state of the display image about the center of rotation that is set depending on the roll state,
    the controller outputs the display image to the display device, and
    wherein the controller sets the center of rotation at any position on a vertical axis passing through a center position of a display region of the display image in a display width direction depending on a vehicle speed of the vehicle.

10. The vehicle circumference monitoring apparatus according to claim 9,
    wherein the controller sets the center of rotation on the vertical axis depending on a distance to an obstacle present in the circumference of the vehicle.

11. The vehicle circumference monitoring apparatus according to claim 10,
    wherein the controller expands and adjusts the display image in the display width direction if the display image is displayed on the display device.

12. The vehicle circumference monitoring apparatus according to claim 11,
 wherein the controller further acquires the vehicle state data indicating a pitch state of the vehicle, and
 wherein the controller moves the display image in a vertical direction depending on the pitch state.

13. The vehicle circumference monitoring apparatus according to claim 10,
 wherein the controller further acquires the vehicle state data indicating a pitch state of the vehicle, and
 wherein the controller moves the display image in a vertical direction depending on the pitch state.

14. The vehicle circumference monitoring apparatus according to claim 9,
 wherein the controller further acquires the vehicle state data indicating a pitch state of the vehicle, and
 wherein the controller moves the display image in a vertical direction depending on the pitch state.

\* \* \* \* \*